(12) United States Patent
Lee et al.

(10) Patent No.: US 7,528,217 B2
(45) Date of Patent: May 5, 2009

(54) POLYMERS AND FIBERS FORMED THEREFROM

(75) Inventors: Kiu-Seung Lee, Midlothian, VA (US); Jon David Hartzler, Midlothian, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 258 days.

(21) Appl. No.: 11/544,118

(22) Filed: Oct. 6, 2006

(65) Prior Publication Data

US 2008/0085992 A1    Apr. 10, 2008

(51) Int. Cl.
*C08G 63/00*    (2006.01)
*C08G 63/02*    (2006.01)

(52) U.S. Cl. .................. 528/272; 428/339; 428/375; 429/30; 429/33; 528/271; 528/362; 528/363

(58) Field of Classification Search .................. 428/339, 428/375; 528/271, 272, 362, 363; 429/30, 429/33
See application file for complete search history.

(56) References Cited

U.S. PATENT DOCUMENTS

| | | | |
|---|---|---|---|
| 3,886,251 A | 5/1975 | Sekiguchi et al. | |
| 4,087,409 A | 5/1978 | Preston | |
| 4,177,347 A * | 12/1979 | Meyer | 548/145 |
| 4,298,565 A | 11/1981 | Yang | |
| 4,340,559 A | 7/1982 | Yang | |
| 4,965,033 A | 10/1990 | Chiou | |

FOREIGN PATENT DOCUMENTS

WO    WO 2004/015803 A    2/2004

OTHER PUBLICATIONS

D. Gomes, J. Roeder, M.L. Ponce, S.P. Nunes; "Chararcterization of partially sulfonated polyoxadiazoles and oxadiazole-triazole copolymers." Journal of Membrane Science, vol. 295, Mar. 3, 2007, pp. 121-129, XPOO2463073, the entire document.
D. Gomes, C. Borges, J.C. Pinto: "Effects of reaction bariables on the reproducibility of the syntheses of poly-1, 3, 4-oxadiazole". Polymer, vol. 45, Jul. 4, 2004, pp. 4997-5004, XP002463074. the entire document.
S. Vetter, S.P. Nunes: "Synthesis and characterization of new sulfonated poly (arylene ether 1, 3, 4-oxadiazole)s". Reactive and Functional Polymers, vol. 61, Jun. 25, 2004, pp. 171-182, XP002463075, the entire document.

U.S. Appl. No. 11/415,026, filed May 1, 2006, Lee et al.
Imai, "Direct Fiber Formation and Fiber Properties of Aromatic Polyoxadiazoles" Journal of Applied Science, vol. 14, pp. 225-239 (1970).
Iwakura et al., "Poly-1,3,4-oxadiazoles", Journal of Polymer Science: Part A, vol. 3, pp. 45-54 (1965).
Beynon, "Monomers Containing Phosphorus", Journal of Polymer Science: Part A, vol. 1, pp. 3357-3372 (1963).
Schulz et al., "Aromatic Poly(1,3,4-oxadiazole)s as Advanced Materials", Advanced Materials, vol. 9, No. 8, pp. 601-613 (1997).
Schulz et al., "Aromatic poly(oxadiazole)s—New Aspects of Their Synthesis, Structures and Properties", Acta Polymer, vol. 43, pp. 343-347 (1992).

* cited by examiner

*Primary Examiner*—Terressa M Boykin

(57) ABSTRACT

Sulfonated polyoxadiazole polymers containing groups selected from:

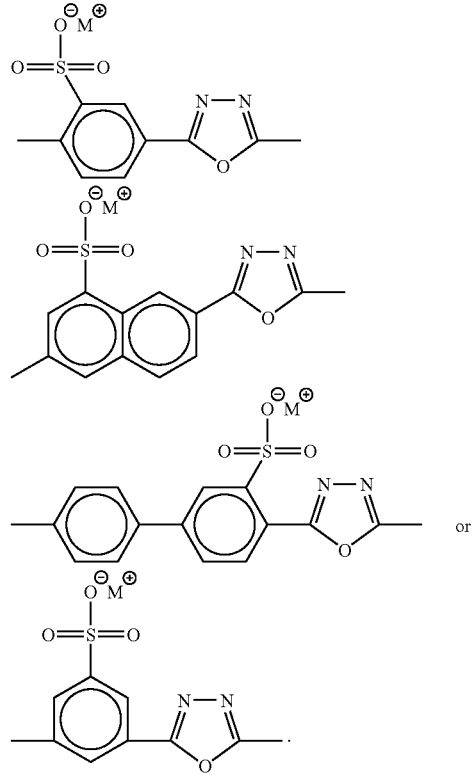

14 Claims, No Drawings

POLYMERS AND FIBERS FORMED THEREFROM

BACKGROUND OF THE INVENTION

1. Field of the Invention

The present invention is directed to preparation of a sulfonated polyoxadiazole polymers and resulting articles such as in fiber form.

2. Description of Related Art

Imai, *Journal of Applied Polymer Science*, Vol. 14, pp 225-239 (1970) discloses preparation of a random copolyoxadiazole by use of fuming sulfuric acid, terephthalic acid, isophthalic acid, and hydrazine sulfate.

A need is present for an alternate process of preparing a dyeable polyoxadiazole copolymer and article resulting therefrom.

SUMMARY OF THE INVENTION

This invention relates to sulfonated polyoxadiazole polymers including copolymers, articles including fibers formed therefrom, of Formula Ia, Ib, Ic, or Id.

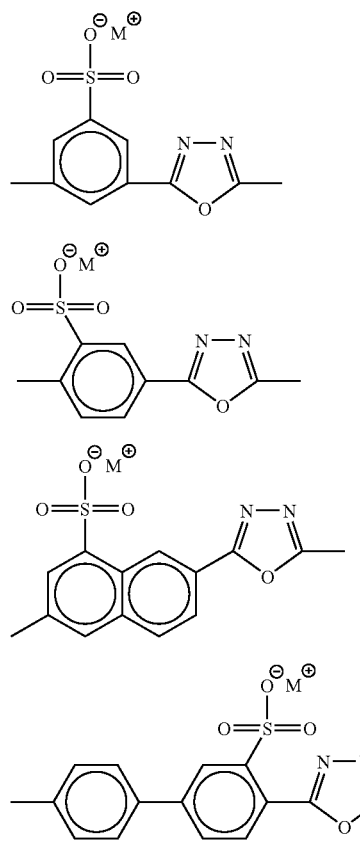

(Formula Ia)

(Formula Ib)

(Formula Ic)

(Formula Id)

where M is a monovalent cation.

DETAILED DESCRIPTION OF THE INVENTION

As set forth in the Summary of the Invention the present invention includes sulfonated polyoxadiazole polymers of Formula Ia, Ib, Ic, and Id.

Examples of monovalent cations, M, include Li, Na, K and $NH_4$.

The polymer present as an article of manufacture is preferably present as a fiber. For purposes herein, the term "fiber" is used herein interchangeably with "filament", and means a relatively flexible, macroscopically homogeneous body having a high ratio of length to width across its cross-sectional area perpendicular to its length. The fiber cross section can be any shape, but is often somewhat circular. Fiber spun onto a bobbin in a package is referred to as continuous fiber. Fiber can be cut into short lengths called staple fiber. Fiber can be cut into even smaller lengths called floc. Multifilament yarns can be combined to form cords. Yarn can be intertwined and/or twisted.

Since copolymers are within the scope of the present invention other moieties can be included in the polymer chain. Representative examples include:

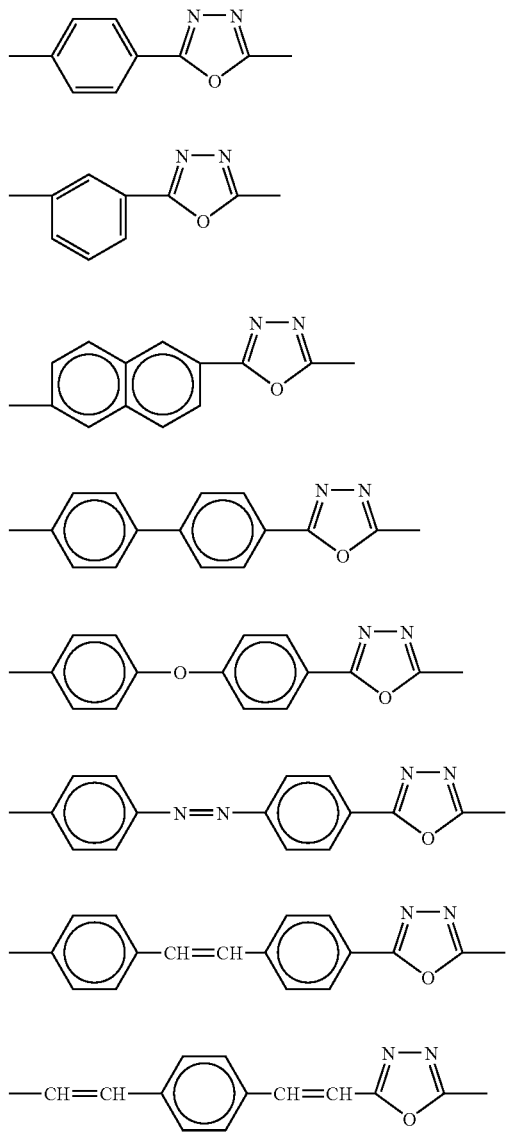

A preferred copolymer of this invention is

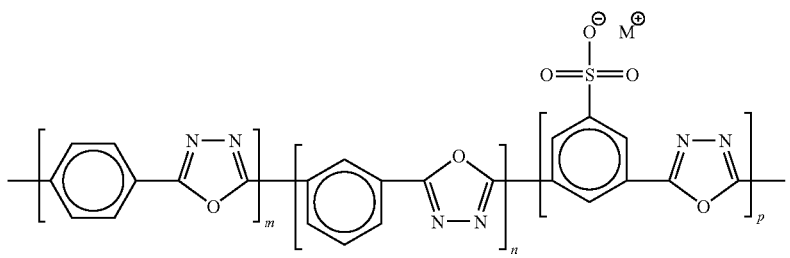

where; $0.5<p<40$, $5<m<95$, $5<n<80$ where p, m, and n are integers.

Processes for the production of polyoxadiazole polymers are well known in the art. Examples of processes for the production of polyoxadiazole (POD) polymers can be found in the Journal of Polymer Science: Part A, 3, 45-54 (1965), Journal of Polymer Science: Part A-1, 6, 3357-3370, (1968), Advanced Materials, 9(8), 601-613, (1997) and U.S. patent application Ser. No. 11/415,026. It is preferred to have a polyoxadiazole polymer of high inherent viscosity such as those produced by the method disclosed in U.S. patent application Ser. No. 11/415,026. The contents of U.S. patent application Ser. No. 11/415,026 are hereby incorporated by reference.

Accordingly the following description is set forth from this patent application.

In an initial first step an insufficient amount of oleum, i.e. sulfur trioxide ($SO_3$) is present in the reaction mixture calculated on the basis of the remaining components of hydrazine sulfate, terephthalic acid, and isophthalic acid in formation of the polyoxadiazole copolymer. The amount of sulfur trioxide ($SO_3$) from the oleum is present in a first reaction step in an amount not greater than 3 molar equivalents based on the number of moles of hydrazine. Generally, the amount of sulfur trioxide ($SO_3$) is present in a range of 2 molar equivalents to 3 molar equivalents on a basis of the number of moles of hydrazine. In comparison the amount of sulfur trioxide to complete the reaction is generally in the range of 5 to 6 molar equivalents of sulfur trioxide ($SO_3$) based on moles of hydrazine.

The temperature at which the remaining components of hydrazine sulfate, terephthalic acid, and isophthalic acid are mixed to form the reaction solution can vary which in turn will determine the degree of randomness of the final copolymer.

Typically hydrazine sulfate expressed as hydrazine is present in an amount from 95 to 100 mole percent in comparison to the total number of moles of terephthalic acid and isophthalic acid. For environmental reasons an excess of hydrazine is not desirable due to reactivity and environmental toxicity of hydrazine. Other researchers have used an excess of hydrazine to achieve high inherent viscosity with an example being Acta Polymer, 43, 343-347 (1992) FIG. 1.

Typically, the amounts of terephthalic acid and isophthalic acid are present in an amount from 65 to 90 mole percent and 35 to 10 mole percent respectively, based on the total number of moles of the two acids.

The three components of hydrazine sulfate, terephtalic acid, and isophtalic acid typically are combined in solid form and thoroughly mixed prior to the first addition of oleum in an amount not greater than 3 molar equivalents of sulfur trioxide ($SO_3$) based on the moles of hydrazine.

It is preferable to control the temperature of the oleum until all the reagents have dissolved. The temperature preferably should be maintained not greater than 50 degrees Celsius, more preferably, not greater than 35 degrees Celsius. An example of addition and dissolution is at about 25 degrees Celsius over the course of about 10 to 20 minutes. It is believed that by maintaining this temperature that a more random distribution of repeat units is achieved in the final polymer chain which results in improved properties. The more random distribution is in comparison to adding the reagents at an elevated temperature. The difference in the relative rates of dissolution of terephthalic acid and isophthalic acid allow the isophthalic acid to dissolve rapidly and react with the diamine prior to the terephthalic acid dissolving and becoming available to enter into the reaction in significant amounts. The result of this elevated temperature addition is the formation of a block copolymer rather than a random copolymer.

Following dissolution with the four components, the solution typically is heated in a range from 100 to 150 degrees Celsius. Preferably the solution is heated in a range from 110 to 130 degrees Celsius. The solution conventionally is stirred until the viscosity of the solution plateaus. Typically, the viscosity maximum occurs after about 30 to 75 minutes of heating. To this solution is added additional oleum containing about 2 equivalents of $SO_3$ based on the number of moles of hydrazine. Three equivalents of $SO_3$ need to react to complete the reaction. Typically about 5 equivalents are used due to the vapor phase equilibrium of $SO_3$ over the reaction. Typically, the solution is stirred and heated in a range from 100 to 150 degrees Celsius, preferably in a range from 110 to 140 degrees Celsius until a second viscosity plateau is reached. Typically, the second viscosity maximum occurs after about 80 to 150 minutes of heating. The solution then is cooled to room temperature and the polymer precipitated such as by the addition of an excess of water. The copolymer is collected and dried.

Although the above process has been described in two steps, it is understood that it is within the scope of the present invention to employ one or more additional steps. Illustratively rather than a single addition of oleum to complete the copolymer formation in the second step, several additions of oleum may be employed to complete copolymer formation.

Fibers of this invention can be spun by the process of passing a polymer solution of polyoxadiazole through at least one static mixer to form a spin dope; and extruding the spin dope through a spinneret to form a fiber. Additionally, the process can further include passing the fiber through an air gap; contacting the dope fiber with a quench solution to form a coagulated fiber; contacting the coagulated fiber with a wash solution; contacting the washed fiber with a neutralization solution to form a neutralized and washed fiber; drying the neutralized and washed fiber; and winding up the dried fiber. The dried fiber can be wound onto a bobbin on a windup device. Extrusion processes suitable for use in making fibers within the scope of the present invention are disclosed in U.S. Pat. Nos. 4,340,559, 4,298,565 and 4,965,033.

The sulfonated polyoxadiazole fibers exhibit improved dyeability over fibers of non-sulfonated polyoxadiazole polymers. The fibers can be solution dyed using both basic or acidic dyes. Basic dyes (or cationic dyes) are used to check the dyeability of the fibers. Cationic dyes such as Basacryl Red GL (Basic Red 29 by Color Index) are frequently used for this purpose because of the depth of the color it generates. Dyes are usually soluble in most of organic solvent and in aqueous medium, but dyeability was tested in aqueous medium. Slight acidity (pH of 4-6) is required to achieve level dyeing with basic dyes. The degree of dyeability can be measured using a calorimeter to measure the reflectance of the sample. A measure of the dyeability is the K/S value obtained from the Kubelka-Munk Equation:

$K/S=(1-R)^2/2R$

As employed herein, K means absorption, S means scattering and R means reflectance. The larger the value of K/S the greater the color uptake (i.e. depth of dyeing). It is desirable to obtain a K/S value of at least 6, more preferably, a value of at least 10, and most preferably, a value of at least 12. For purposes of this invention a dyeable fiber is a fiber having a K/S value of at least 6.

Test Methods

Degree of Dyeability:

A dyed specimen is placed on white paper and the light reflection R of the dyed specimen is measured at a wavelength at which the dyed specimen exhibited a minimum absorption of light using colorimeter such as Macbeth Color-Eye Model M-2020PL™.

The K/S value of the dyed specimen is calculated from reflectance R in accordance with the Kubelka-Munk equation;

$K/S=(1-R)^2/2R$

The larger the value of K/S, the higher the color depth (darkness) of the dyed specimen.

EXPERIMENTAL EXAMPLES

Example 1

Into the reaction kettle, 442 parts of 30% (w/w) oleum, 45.861 part of hydrazine sulfate, 46.585 parts of terephthalic acid, 8.734 parts of isophthalic acid, and 4.909 parts of 5-sulfoisophthalic acid monolithium salt were charged. The reaction kettle was placed in the silicon oil bath and stirred at room temperature until all the solid reagents are completely dissolved.

The reaction mixture was heated slowly to 120 C and held at this temperature for 2 hours to build up the molecular weight. The reaction mixture was cooled to 50 C and added concentrated sulfuric acid (93-97%) until all of excess sulfur trioxide is transformed into sulfuric acid.

A portion of the resulting solution was precipitated in the ice water, isolated as solid particles, and dried in a vacuum oven at 120 degrees Celsius overnight. The polymer sample was added to a boiling aqueous solution of Basacryl Red GL at pH of 4-5 for dyeability. The polymer particles were dyed dark red of K/S value over 12.

Comparative Example

Polyoxadiazole polymer prepared as in Example 1 except that 4.909 parts of 5-sulfoisophthalic acid monolithium salt was not added, but replaced with 2.911 parts of isophthalic acid. The resulting polymer was not dyed at all using the same dyeing procedure.

What is claimed is:

1. A sulfonated polyoxadiazole polymer containing a repeating unit of the formula comprising:

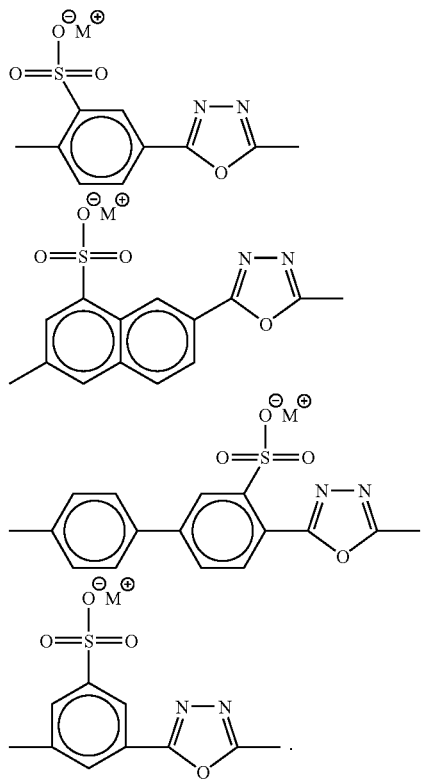

where M is a monovalent cation selected from lithium, sodium, ammonium or potassium.

2. The polymer of claim 1, which additionally contains a repeating unit of

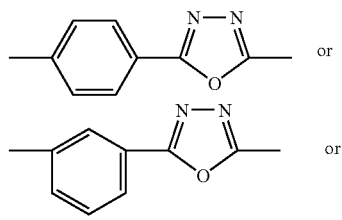

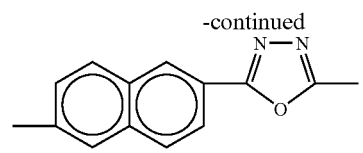 or
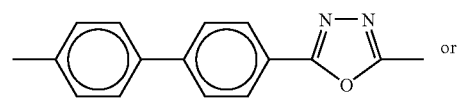 or
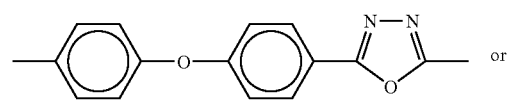 or
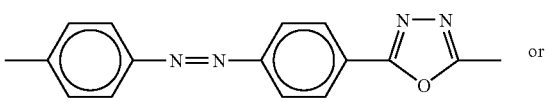 or
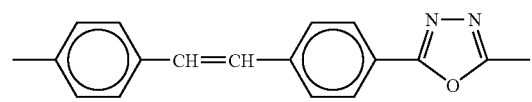 or
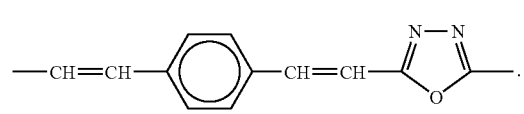.
3. The polymer of claim 2, which contains at least two repeating units of
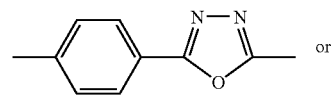 or
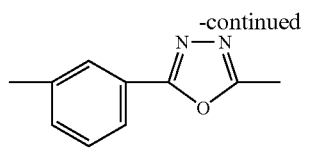 or
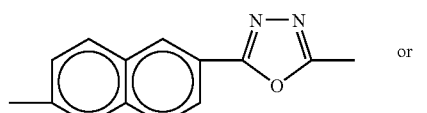 or
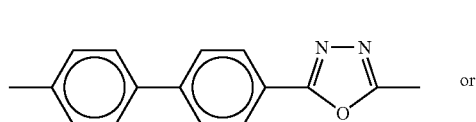 or
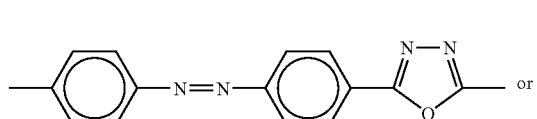 or
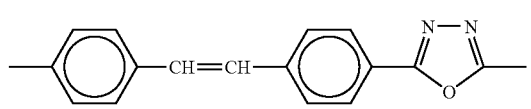 or
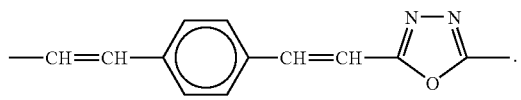.
4. The polymer of claim 3, which contains:
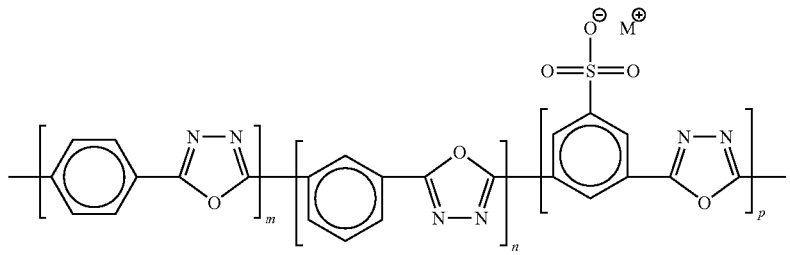

wherein:
0.5<p<40, 5<m<95, 5<n<80 where p, m and n are integers.

5. The polymer of claim 1, wherein:
the cation is lithium or sodium.

6. The polymer of claim 5, wherein:
the cation is lithium.

7. The polymer of claim 1, wherein:
the sulfonated polyoxadiazole polymer is a copolymer.

8. The polymer of claim 7, wherein:
the polyoxadiazole copolymer comprises at least two aromatic ring systems selected from:

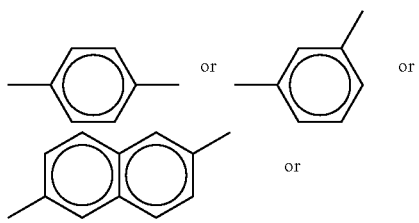

-continued

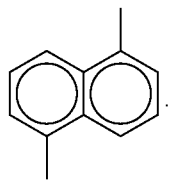

9. The polymer of claim 1 present as a fiber.

10. The fiber of claim 9, wherein:
the fiber is dyeable.

11. The fiber of claim 10, wherein:
the K/S value is at least about 6.

12. The fiber of claim 10, wherein:
the K/S value is at least about 10.

13. The fiber of claim 11, wherein:
the K/S value is at least about 12.

14. The fiber of claim 1, wherein:
the fiber is dyed.

* * * * *